(No Model.)
G. E. WINSLOW.
APPARATUS FOR INDICATING AND RECORDING CHANGES AT A DISTANT POINT.
No. 395,862. Patented Jan. 8, 1889.
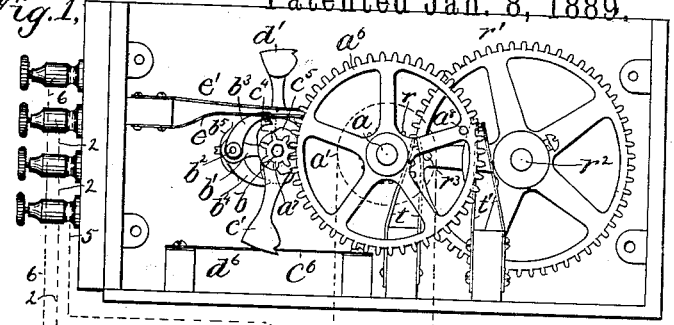
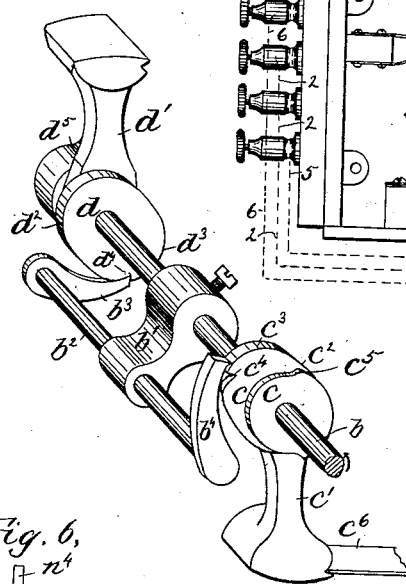
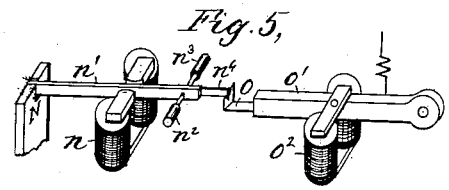
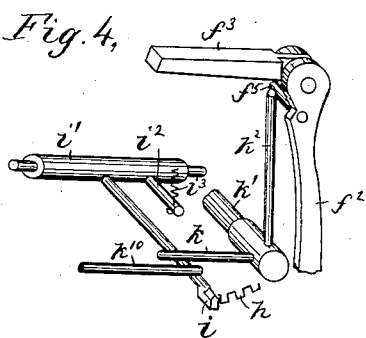
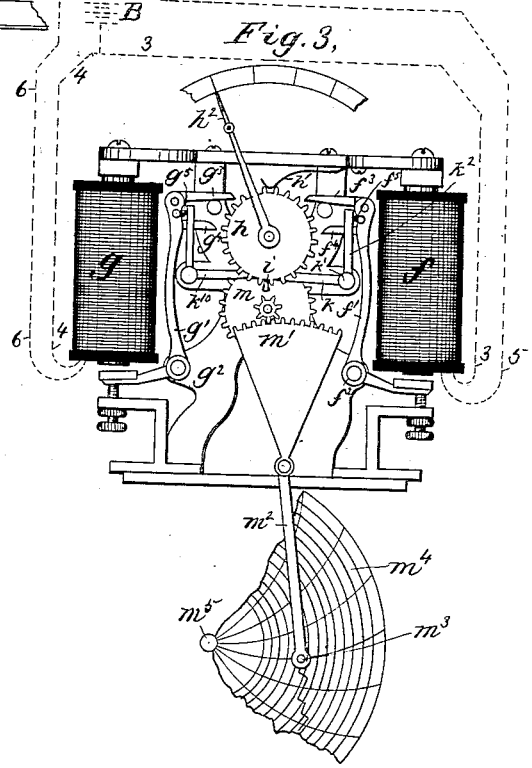
Witnesses.
Jas. J. Maloney.
M. E. Hill.
Inventor
George E. Winslow,
by Jos. P. Livermore
Att'y.

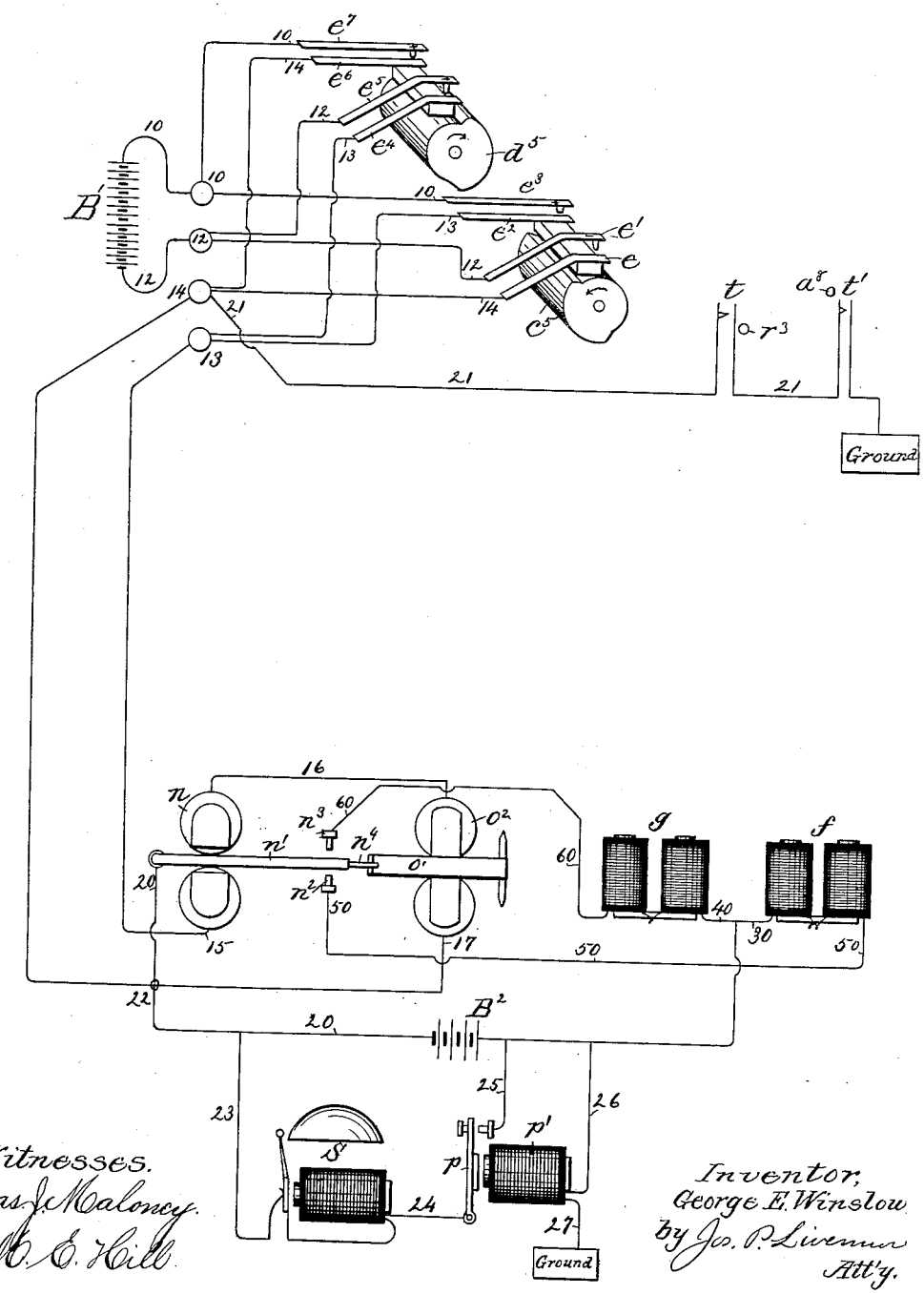

UNITED STATES PATENT OFFICE.

GEORGE E. WINSLOW, OF WALTHAM, MASSACHUSETTS.

APPARATUS FOR INDICATING AND RECORDING CHANGES AT A DISTANT POINT.

SPECIFICATION forming part of Letters Patent No. 395,862, dated January 8, 1889.

Application filed March 27, 1888. Serial No. 268,667. (No model.)

*To all whom it may concern:*

Be it known that I, GEORGE E. WINSLOW, of Waltham, county of Middlesex, and State of Massachusetts, have invented an Improvement in Apparatus for Indicating and Recording Changes at a Distant Point, of which the following description, in connection with the accompanying drawings, is a specification, like letters on the drawings representing like parts.

My invention relates to an apparatus for indicating and recording changes in condition of a distant object—such, for instance, as the rise and fall of water in a reservoir—and also for producing a record of such changes.

The apparatus comprises a transmitter that is operated by the changes in condition that are to be indicated and produces changes in an electric circuit corresponding in number and character to such changes in condition, and which cause an electric current to operate a receiving-instrument at the place where such changes in condition are to be indicated.

For convenience in description the apparatus will be described as operating to indicate changes in the level of water, although it is obvious that changes of other kinds can be indicated at a distant point by apparatus of substantially the same construction and mode of operation.

The transmitting-instrument must produce effects of one kind on the receiving-instrument to indicate changes of one character— as, for example, the rise of the water-level— and effects of another character to indicate the fall of the water-level, and the degrees of change can be indicated with any desired degree of minuteness—as, for example, for each inch change in the water-level.

Care must be taken in the construction of the instrument to guard against a false registration by changes that are a greater or less fraction of those that are to be indicated— as, for example, if the water should rise three-fourths of an inch, the transmitter must not produce any effect on the circuit—and the moment that an indication of one kind is made— as, for example, that of an inch rise—the instrument must be ready to make the indication in the opposite direction in case a change of opposite character begins. If, for example, the water should rise just one inch from any given point and make the corresponding record, and should then begin to fall without performing the operation of indicating for such fall, the receiving-instrument or indicator would be thrown out of unison or harmony with the transmitter-instrument and the indications would be falsified.

The invention consists in various combinations and arrangement of parts for insuring the proper action of the transmitter and receiver, which will be hereinafter pointed out, and also in the combination of such parts with suitable electric circuits and batteries or other generators of electricity by which the operation of the transmitter is caused to produce corresponding operations of the receiving-instrument or indicator proper.

Figure 1 is a side elevation of a transmitting-instrument forming part of the indicating apparatus embodying this invention; Fig. 2, a detail showing in perspective a part of said transmitting-instrument; Fig. 3, a front elevation of the receiving-instrument; Fig. 4, a detail showing in perspective a portion of said receiving-instrument; Fig. 5, a diagram perspective view showing the operative part of a relay that may be included in the circuit connecting the transmitter and receiving instruments, for the purpose hereinafter explained; Fig. 6, a detail thereof, to be referred to; and Fig. 7, a diagram showing the circuits preferably employed for connecting the transmitting-instrument and the receiving-instrument.

The transmitting-instrument comprises a shaft, $a$, which may be provided with a pulley, as indicated in dotted lines at $a'$, so that the said shaft is turned in one or the other direction in accordance with changes of condition to be indicated, as, for example, by the rise and fall of the water-level indicated at $a^2$, which acts through a float, $a^3$, and cord or chain $a^4$ and counter-weight $a^5$ to rotate the said shaft $a$ and pulley $a'$ in one or the other direction, according as the water-level rises or falls. As shown in this instance, the shaft $a$ is provided with a gear, $a^6$, meshing with a pinion, $a^7$, on a shaft, $b$, which carries the devices that produce the changes in circuit by which the receiving-instrument is operated.

The gears $a^6$ $a^7$ are merely to increase the movement of the shaft $b$ with relation to the variable actuator $a^3$, the changes of position of which are to be indicated, and it is apparent that the variable actuating part $a^3$ might act directly on the shaft $b$ where such increase of movement is not needed, as it is merely necessary that the shaft $b$ should be turned in one direction as the actuating object varies in one way and should be turned in the opposite direction as the said object varies in the opposite way, and that the amount of movement of the shaft $b$ should be proportioned to the variations in the object to be indicated.

The rotation of the shaft $b$ in one or the other direction controls the circuits between the transmitting-instruments and the receiver by means of two gravitating actuators or weighted cam-hubs that operate circuit-controlling contacts in their falling movement. One of the cam-hubs is engaged and rotated by the shaft as it turns in one direction and the other as it turns in the opposite direction by the following mechanism: The said shaft $b$ has fixed upon it an arm or pawl-carrier, $b'$, in which is pivoted a shaft or arbor, $b^2$, having fixed upon its ends pawls $b^3$ $b^4$, that project in opposite directions with relation to said pawl-carrier, as best shown in Fig. 1, and, owing to the fact that they are connected together, the end of one of said pawls must move inward toward the axis of the shaft $b$ as the other moves outward, and the reverse. The said shaft $b$ also has loose upon it the two cam-hubs $c$ $d$, which are substantially similar to one another, so that the description of one will answer for both, the reference-letters indicating corresponding parts having the same characteristics. Each of said cam-hubs is provided with a weighted arm, $c'$ $d'$, which tends to remain by gravity in the position of the one arm $c'$ and to come to said position under the action of gravity when permitted.

The cam-hub has a portion, $c^2$, on which the end of the pawl $b^4$ travels, and a portion of said surface is raised, as shown at $c^3$, so that when the corresponding pawl, $b^4$, travels over it it tends to throw the said pawl outward, and thus, as before stated, tends to move the other pawl inward, or, in other words, prevent it from moving outward as long as the pawl $b^4$ is on the high part $c^3$. This high part $c^3$ is provided with a notch, $c^4$, at one side of the axis of the shaft $b$, while the corresponding notch, $d^4$, of the other cam-hub is normally at the other side of the axis when both arms $c'$ $d'$ are hanging down in their normal position. The action of gravity on the pawls $b^3$ $b^4$ is such that the weight of the pawl that is lowermost tends to throw the other pawl into the notch of the corresponding cam-hub when in the rotation of the shaft $b$ the pawl is approaching said notch, and this tendency may be increased by light springs $b^5$, which tend to keep the pawls both at about the same distance from the shaft $b$. Thus, when both of the weighted arms are hanging downward in their normal position and the shaft $b$ is turned, for example, in the direction of the arrow, Fig. 2, the pawl $b^3$ would have engaged with the high part $d^3$ of the cam-hub $d$ while the pawl $b^4$ was on the lower part of the cam-hub $c$, so that the pawl $b^3$ could ride up on the high part of the cam $d$, where it would engage the notch $d^4$, this having occurred when the cam-hub $d$ and shaft $b$ were at position about half a turn from the position shown in Figs. 1 and 2. Then, as the shaft $b$ continued to move in this direction, the pawl $b^3$ would fall into the notch $d^4$ and turn the cam-hub $d$ with it, carrying the weighted arm $d'$ around until nearly vertically over the shaft, as shown in Fig. 2. When the said weighted arm $d'$ is nearly in the vertical position, as shown, the opposite pawl, $b^4$, is on the high part $c^3$ of the other cam-hub, $c$, so that even if the weighted arm $d'$ were carried beyond the vertical position, so that it tended by gravity to fall away from the pawl $b^3$, it could not do so, as the inclined face of the notch $d^4$ would engage the under part of the pawl $b^3$ and prevent such falling of the weight as long as the pawl $b^3$ was prevented from moving outward by the high part $c^3$ of the other cam-hub acting on the pawl $b^4$. The object of this is that even if the arm $d'$ were carried beyond the vertical position, it might fall if acted upon by gravity alone; but just at this moment if the shaft $b$ should begin to turn in the other direction—say that opposite the arrow in Fig. 2—it will be seen that the other hub, $c$, would not be engaged in such return movement, and consequently if the arm $d'$ had fallen, and thus given the indication for the movement in the direction of the arrow, the arm $c$ would not be ready to give the corresponding indication for the return movement; but by having the pawl $b^3$ held as shown, if the shaft $b$ should reverse its movement when in the position shown in Fig. 2, the said pawl $b^3$ would engage the under or inclined part of the notch $d^4$ and turn the arm $d'$ backward, so that it would not give an indication, since a complete rotation of said arm is required to give the indication corresponding to a complete rotation of the shaft $b$ in the direction of the arrow. If, however, the said shaft $b$ continues its movement in the direction of the arrow a trifle farther, the pawl $b^3$ will be permitted by the notch $c^4$ to drop, which will permit the pawl $b^3$ to move out and let the arm $d'$ fall, completing its rotation in the direction in which the shaft $b$ is moving, and thus make its indication for the single rotation of the shaft $b$ in the direction of the arrow; but if immediately after this has occurred the shaft $b$ should begin to turn in the opposite direction it would engage the cam-hub $c$, so that if it made a complete turn in this reverse direction the arm $c$ will be carried with it and indicate such return movement. The circuit changes by which the movements of the weighted arms $c'$ $d'$ are caused to transmit corresponding indications to the receiving-instrument are produced by cam-surfaces $c^5$ $d^5$, which in the fall of the weighted arms by gravity act on pairs of contact-springs $e\ e'$, &c., Fig. 1. When the weighted arms $c'\ d'$ fall, they pass over spring-fingers $c^6\ d^6$, which prevent return movement and stop oscillation of said arms, as will be readily understood from Figs. 1 and 2.

For the simplest electrical connection between the transmitting-instrument and receiving-instrument represented in Fig. 3 there might be merely a pair of springs, $e\ e'$, operated by the cam $c^5$, and a corresponding pair operated by the corresponding cam, $d^5$, of the other weighted arm, one spring of each pair being connected, for example, with a battery-wire, (indicated at 2, Figs. 1 and 3,) and thus connecting one pole of the battery B with one spring of each pair, the other pole of said battery being connected by wires 3 and 4 with one terminal of each of the magnets $f$ and $g$ of the receiving-instrument. The other terminal of the magnet $f$, for example, would be connected by wire 5 with the other spring of the pair controlled by the cam-hub $c$, and the other terminal of the other magnet, as $g$, would be connected by wire 6 with the other spring of the pair controlled by the cam-hub $d$. Thus the two springs of a pair, being normally open, will be pressed together by the passage of the high part $c^5$ or $d^5$ of the corresponding cam-hub when the weighted arm falls after being released by its pawl, as before described. Such fall of the arm $c'$, or, in other words, complete rotation of the cam-hub $c$, will thus close and then open the circuit through the magnet $f$, while the corresponding complete rotation of the cam-hub $d$ will close and open the circuit through the magnet $g$ of the receiving-instrument, the construction of which will now be described.

The magnets $f$ and $g$ and parts controlled immediately by them are substantially alike, so that the description of one will answer for both, the reference-letters being characterized to correspond, as in the case of the transmitter cam-hubs.

The armature-lever $f'$, pivoted at $f^2$, is provided with a pawl, $f^3$, which, when the said armature is attracted, acts on the teeth of a wheel, $h$, turning the said wheel for the space of one tooth in one direction. The pawl $g^3$ of the magnet $g$ turns the said wheel $h$ in the opposite direction, so that it will be understood that the said wheel $h$ is moved for the space of one tooth in one or the other direction, according as the shaft $b$ of the transmitter makes a rotation in one or the other direction. A stop, $f^4$, brings up on the wheel $h$, preventing the pawl $f^3$ from carrying the wheel $h$ more than the space of one tooth, and a friction device, $h'$, tends to prevent sudden movement of the wheel $h$.

The wheel $h$ is provided with a locking device, which engages it and prevents it from rotating when disengaged by the pawls of both magnets, as shown in Fig. 3. The construction and mode of operation of this locking device are best shown in Fig. 4. It consists of a bolt or finger, $i$, connected with a rock-shaft, $i'$, and movable into and out from the space between the two lower teeth of the wheel $h$. The upper part of the locking-finger $i$ is beveled, as shown, to facilitate its entrance between the teeth of the wheel, the outline of a portion of which is shown in Fig. 4; but below the beveled portion the finger is square, so as not to be thrown out by any tendency of the wheel to rotate.

The rock-shaft $i'$ is provided with an arm, $i^2$, acted upon by a spring, $i^3$, tending to rotate the said shaft in the direction to throw the finger $i$ up between the teeth, and the said finger must be moved down from between the teeth before the pawl $f^3$ or $g^3$ of either magnet engages the teeth. This is accomplished by an arm, $k$, connected with a rock-shaft, $k'$, provided with an arm, $k^2$, acted upon by a projection, $f^5$, from the armature-lever $f'$, it being understood that a similar arm, $k^{10}$, is operated in a similar manner by a projection, $g^5$, from the armature-lever $g'$. Thus, when either pawl moves forward toward the wheel $h$, the projection $f^5$ (or corresponding projection, $g^5$) engages the arm $k^2$ before the pawl $f^3$ reaches the teeth of the wheel, and the arms $k\ k^2$ constitute a bent lever, which, when thus engaged and operated by the projection $f^5$, moves the locking projection $i$ down from between the teeth of the wheel $h$, so that the pawl $f^3$ in its further movement upon reaching and engaging the wheel can turn the same for the space of one tooth, as before described. The spring $i^3$ tends to move the parts in the opposite direction, and thus constitutes a retractor for either of the armature-levers that may have been moved by the attraction of its magnet.

The arbor of the wheel $h$ may be provided with a pointer, as indicated at $h^2$, co-operating with a dial the graduations of which correspond to the movements of the actuator $a^3$ of the transmitting-instrument that produces the complete rotations of the shaft $b$, and consequently the position of the pointer on the dial will always indicate accurately the position of the part $a^3$ to the nearest space that is required to make a turn of the shaft $b$.

For the purpose of keeping a record of variations of position of the actuator $a^3$ the arbor of the wheel $h$ is connected by a train of wheel-work, $m$, with a toothed sector, $m'$, the arbor of which may be provided with an arm, $m^2$, having a marker, $m^3$, co-operating with a dial, a portion of which is shown at $m^4$, said dial being rotated by the arbor $m^5$ of a clock at a uniform time movement, and being marked off by substantially-radial lines that indicate time and by circular lines that indicate the difference of position of the actuator $a^3$, so that the trailing mark made by the marker $m^3$ leaves a complete record of the position of the actuator $a^3$ during the entire time that the dial is making a revolution.

The circuit shown in dotted lines, Figs. 1 and 3, is perhaps the simplest, but involves two independent circuits, and thus requires two wires from the transmitter to the receiver if a ground-circuit is employed or three wires if a wholly metallic circuit is employed, and in order to work the two magnets $f$ and $g$ independently by making them respond to the movements of the cam-hubs $c$ and $d$, respectively, by a single circuit the arrangement shown in the diagram Fig. 7 may be adopted, in which but a single circuit is required, involving the use of one wire between the transmitter and receiver if a ground-circuit is employed or two wires if a metallic circuit is employed, as shown. In this construction each cam-hub operates two pairs of springs, the portion $c^5$ of the cam-hub $c$ closing the springs $e\ e^2$ against the springs $e'\ e^3$ as the arm $c'$ falls by gravity, and the corresponding cam-surface, $d^5$, of the cam-hub $d$ closing the springs $e^4\ e^6$ against the springs $e^5\ e^7$. These four pairs of springs are connected with the line and battery, as shown, so as to constitute a pole-changer, one set of springs operated by one cam-hub closing the battery to line with its poles in one position and the other set of springs closing it to line with its poles in the opposite position. To effect this, one pole of the battery B' is connected by wire 10 with one of the springs, $e^3\ e^7$, of each pair, making such springs, for example, positive, as marked, and the other pole is connected by wire 12 with the other spring of each pair—namely, $e'$ and $e^5$—which are thus made negative. One terminal, 13, of the main line connecting the transmitter and receiver is connected with one of the lower springs of each pair—as, for example, $e^2\ e^4$—that co-operate with upper springs of opposite polarity, and the other terminal, 14, of the main line is connected with the other springs, $e\ e^6$. Thus, when the pairs $e\ e'\ e^2\ e^3$ are closed, the positive pole of the battery is connected with the terminal 13 and the negative with the terminal 14 of the main line, and when the other pairs, $e^4\ e^5\ e^6\ e^7$, are closed the negative pole of the battery is connected with the terminal 13 and the positive with the terminal 14, thus sending the current in the opposite direction. These two conditions of the current are caused to effect the magnets $f$ and $g$, respectively, by the intervention of a relay at the receiving-station, the construction of which is best shown in Fig. 5. The said relay consists of a polarized magnet, $n$, and armature $n'$ and two contact-stops, $n^2\ n^3$, co-operating with said armature in its different positions. The said armature $n'$ and its stops $n^2\ n^3$ constitute a polarized relay that controls two local circuits for the magnets $f$ and $g$, respectively, as clearly shown in Fig. 7, one pole of the battery $B^2$ of said local circuit being connected by wire 20 with said armature, its other pole being connected by wires 30 and 40 with one terminal of each of the magnets $f$ and $g$, respectively, and the other terminal of the magnet $f$ being connected by wire 50 with the stop $n^2$, and the other terminal of the magnet $g$ being connected by wire 60 with the stop $n^3$. As the polarized armature will remain against either stop to which it may be moved after the current that moved it has ceased, means are provided for retracting it to an intermediate position between the two stops $n^2\ n^3$ after each impulse has ceased, as follows: The armature $n'$ has a projecting finger, $n^4$, which stands over a V-shaped notch in a projection, $o$, of the armature-lever $o'$ of a neutral magnet, $o^2$, included in the same circuit with the polarized relay-magnet $n$. The armature-lever $o'$ moves in a plane at right angles to that in which the armature $n'$ moves, and the V-shaped fork will be moved away from the finger $n^4$ each time the circuit is closed, regardless of the polarity of the current, thus permitting the armature $n'$ to respond and move in one or the other direction, according to the polarity of the current. When the current ceases, the retractor of the armature-lever $o'$ will move the forked end up against the projection $n^4$, thus acting like a wedge on said projection to move it back to its intermediate position, as will be best understood from Fig. 6, which is a section of the projection $o$ of the armature-lever of the neutral magnet, looking toward the end of the polarized armature. The main line passes from the terminal 13 to one terminal, 15, of the polarized relay-magnet, and from the other terminal of said polarized relay-magnet by connection 16 to one terminal of the neutral magnet $o^2$, the other terminal, 17, of which is connected with the terminal 14 at the transmitter, or said terminals 14 and 17 may be grounded.

Means are also provided for giving a special signal or alarm in case the actuator $a^3$ arrives at a predetermined limit, or, in other words, at the end of any desired predetermined number of movements of the shaft $b$ in one direction. For this purpose the shaft $a$ is connected by gears $r\ r'$ with a shaft, $r^2$, which makes one rotation at the end of any predetermined number of rotations of the shaft $b$, according to the proportions of the gear-wheels on the shafts $a$, $b$, and $r^2$. The shaft $r^2$ or gear-wheel $r'$ thereon is provided with a projection, $r^3$, which once in the rotation of said shaft closes a circuit-closer, $t$, which is normally open. The shaft $a$ or wheel $a^6$ thereon is provided with a projection, $a^8$, that once at each rotation closes a normally-open circuit-closer, $t'$. The said circuit-closers $t\ t'$ are placed in circuit *seriatim*, as shown in Fig. 7, so that both have to be closed simultaneously in order to close the circuit to the signal or alarm instrument S', Fig. 7. Thus, although the circuit-closer $t'$ is closed at each revolution of the shaft $a$, it does not produce any effect until at the end of a complete rotation of the shaft $r^2$, when the projection $r^3$ keeps the circuit-closer $t$ closed, while the projection $a^8$ closes the circuit-closer $t'$, and thus completely closes the circuit connecting the transmitting-instrument with the alarm-instrument S.

The circuit of the alarm-signal S may include one of the wires that connect the transmitter and receiving apparatus, before described, without interfering with their operation, which is desirable when the transmitter is at a considerable distance from the receiver, as it saves expense in line construction. This may be effected, as shown in Fig. 6, by having the circuit-closers $t\ t'$ interposed between the ground and one terminal, as 14, of the main line connecting the transmitter and receiver, such connection being shown at 21, Fig. 7. The line 14 17 is connected at 22 with the battery-wire 20 of the local circuit between the relay and receiving-instrument, and from one side of the battery $B^2$ in said local circuit there is a branch, 23, extending to one terminal of the magnet of the signal S, which is shown as a vibrating bell, the other terminal of which is connected by wire 24 with the armature $p$ of a relay-magnet, $p'$, the front stop of which armature is connected, as shown at 25, with the portion of the local circuit at the other side of the battery $B^2$, so that when the said armature is attracted the signal S is in circuit with the battery $B^2$, that operates the magnets $f\ g$ of the receiving-instrument. Beyond the battery $B^2$ from the point 22, connected with the main line, is another branch, 26, connected with one terminal of the relay-magnet $p'$, the other terminal of which is grounded, as shown at 27. The pin $a^8$ on the wheel $a^6$ is so located that it closes the circuit-closer $t'$ in a portion of the rotation of the shaft $b$ in which neither of the weighted cam-hubs is permitted to fall, so that the two operations—namely, that of the cam-hubs and that of the circuit-closers $t\ t'$—will not interfere with one another, although they might be made to work simultaneously, if need be, by properly proportioning the different batteries. When both circuit-closers $t\ t'$ are closed, a circuit is afforded from the ground by wire 21 to the terminal 14, thence by the main line to the point 22, and thence by wire 20 to the battery $B^2$, and from said battery by wires 26 and 27 to the ground through the magnet $p'$, which is thus energized by the current of the battery $B^2$ in the grounded circuit and attracts its armature, thus closing the local circuit 20 23 24 25, through the same battery, $B^2$, and the signal S, the current of the battery dividing between the signal and relay magnets and being sufficient to operate both. The current of the battery $B^2$ thus does not pass through the relay-magnets $n$ and $o^2$, that control the receiving-instrument, and would not interfere with the operation of said relay-magnets even if one of the cam-hubs should operate while the circuit-closers $t\ t'$ were closed, and the battery $B^2$ might afford sufficient current to operate the magnet $f$ or $g$ of the receiving-instrument at the same time with the magnet of the signal S and its relay if there should be any occasion to do so.

The invention is not limited to the specific construction of the devices shown and described, as it is obvious that this can be varied by the substitution of various mechanical devices having substantially the same mode of operation, which may be regarded as mechanical equivalents for the specific devices shown.

I claim—

1. The combination of a movable actuator the changes in position of which are to be indicated with two electric contact-makers, and two corresponding weights each having a part that engages and operates the corresponding contact-maker when the weight falls, and a weight-lifting pawl corresponding to each of said weights operatively connected with the said movable actuator, one pawl engaging its corresponding weight only when the actuator moves in one direction and the other pawl engaging the other weight only when the actuator moves in the opposite direction, substantially as described.

2. The combination of a shaft capable of rotary movement in either direction with a pawl-carrier and two connected oppositely-extended pawls thereon and weighted cam-hubs loose on said shaft, each provided with a shoulder to be engaged by the corresponding pawl, as set forth, whereby one is operated by movements of the shaft in one direction and the other by movements of the shaft in the opposite direction, substantially as described.

3. The combination of the shaft and pawl-carrier thereon with two pawls supported on said pawl-carrier and connected together, as set forth, and two weighted cam-hubs loose on said shaft, each hub having a raised portion provided with a notch to be engaged by the corresponding pawl, and the raised portion of one of said cam-hubs holding the other pawl in the notch engaged by it, substantially as and for the purpose set forth.

4. In a receiving-instrument, a toothed wheel capable of moving in either direction, combined with two electro-magnets and armature-levers therefor, provided with pawls, one of which rotates the said wheel in one direction and the other in the other direction, and a locking device for said wheel, consisting of the finger having a beveled portion and a square portion of proper width to enter between the teeth, and elbow-levers that operate the said locking device and are themselves operated by each of said armature-levers, as described, whereby the wheel is unlocked before the pawl of either armature-lever engages it, substantially as described.

5. The combination of a transmitting-instrument having two sets of contacts and a battery and line connected with the said contacts, as set forth, whereby one set of contacts connects the battery to line in one position and the other in the opposite position, with a polarized relay in said main circuit and a neutral electro-magnet in said circuit and armature therefor, having a notched projection that engages the armature of the polarized relay and retracts it to an intermediate position between its magnet-poles when the said armature of the neutral magnet is retracted, and a receiving-instrument having two electro-magnets and circuits therefor, controlled by the armature of said polarized relay and contacts at either side thereof, respectively, substantially as described.

6. The combination of a transmitting-instrument having two sets of contacts and a battery and a line connected with said contacts, as set forth, and the polarized relay at the receiving-station in said line, with a ground branch from said line at the transmitter and normally-open circuit-closer therein, a branch from said line between the transmitter and relay at the receiving-station, including a battery and relay connected with the ground, and a local circuit for said battery controlled by said relay, and the signal or alarm instrument included in said local circuit, substantially as described.

In testimony whereof I have signed my name to this specification in the presence of two subscribing witnesses.

GEO. E. WINSLOW.

Witnesses:
 JOS. P. LIVERMORE,
 JAS. J. MALONEY.